US007889053B2

(12) United States Patent
McGrath et al.

(10) Patent No.: US 7,889,053 B2
(45) Date of Patent: Feb. 15, 2011

(54) REMOTE, NON-CONTACTING PERSONNEL BIO-IDENTIFICATION USING MICROWAVE RADIATION

(75) Inventors: William R. McGrath, Monrovia, CA (US); Ashit Talukder, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 163 days.

(21) Appl. No.: 11/784,207

(22) Filed: Apr. 5, 2007

(65) Prior Publication Data

US 2007/0257787 A1 Nov. 8, 2007

Related U.S. Application Data

(60) Provisional application No. 60/789,458, filed on Apr. 5, 2006.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |
| ***G08C 19/00*** | (2006.01) |

(52) U.S. Cl. ...................... 340/5.82; 340/5.1; 340/5.21; 340/5.8; 340/5.81; 340/505

(58) Field of Classification Search ......... 340/5.1–5.21, 340/5.7, 5.8–5.82, 10.1, 825.77, 505, 5.3, 340/5.53, 825.36; 342/22, 28, 114, 115, 342/160, 162

See application file for complete search history.

(56) References Cited

U.S. PATENT DOCUMENTS

| | | | | |
|---|---|---|---|---|
| 5,448,501 | A * | 9/1995 | Hablov et al. | 340/573.1 |
| 5,507,291 | A * | 4/1996 | Stirbl et al. | 600/407 |
| 5,760,687 | A * | 6/1998 | Cousy | 340/554 |
| 6,031,482 | A * | 2/2000 | Lemaitre et al. | 342/22 |
| 6,057,761 | A * | 5/2000 | Yukl | 340/568.1 |
| 6,307,475 | B1 * | 10/2001 | Kelley | 340/573.1 |
| 6,313,743 | B1 * | 11/2001 | Abraham-Fuchs et al. | 340/505 |
| 6,909,397 | B1 * | 6/2005 | Greneker, III et al. | 342/173 |
| 6,927,691 | B2 * | 8/2005 | Yukl | 340/568.1 |
| 7,135,980 | B2 * | 11/2006 | Moore et al. | 340/573.1 |
| 7,199,749 | B2 * | 4/2007 | Greneker et al. | 342/22 |
| 2002/0138768 | A1 * | 9/2002 | Murakami et al. | 713/202 |
| 2003/0130697 | A1 * | 7/2003 | Halperin et al. | 607/2 |
| 2003/0135097 | A1 | 7/2003 | Wiederhold et al. | |
| 2003/0178034 | A1 * | 9/2003 | Yuki | 128/922 |

(Continued)

FOREIGN PATENT DOCUMENTS

WO 2008054490 A2 5/2008

*Primary Examiner*—Daniel Wu
*Assistant Examiner*—Son M Tang
(74) *Attorney, Agent, or Firm*—Christie, Parker & Hale, LLP

(57) ABSTRACT

A system to remotely identify a person by utilizing a microwave cardiogram, where some embodiments segment a signal representing cardiac beats into segments, extract features from the segments, and perform pattern identification of the segments and features with a pre-existing data set. Other embodiments are described and claimed.

8 Claims, 1 Drawing Sheet

U.S. PATENT DOCUMENTS

2004/0123667 A1 7/2004 McGrath
2006/0028389 A1* 2/2006 Yukl .......................... 343/853
2007/0066904 A1* 3/2007 Wiesmann et al. .......... 600/508
2008/0045832 A1* 2/2008 McGrath .................... 600/427

* cited by examiner

REMOTE, NON-CONTACTING PERSONNEL BIO-IDENTIFICATION USING MICROWAVE RADIATION

BENEFIT OF PROVISIONAL APPLICATION

This application claims the benefit of U.S. Provisional Application No. 60/789,458, filed Apr. 5, 2006, which is herein incorporated by reference.

GOVERNMENT INTEREST

The invention described herein was made in the performance of work under a NASA contract, and is subject to the provisions of Public Law 96-517 (35 USC 202) in which the Contractor has elected to retain title.

FIELD

The present invention relates to bio-identification of people using microwave radiation.

BACKGROUND

Accurate identification of people is critical for law enforcement, as well as for many security and fraud-detection applications in the public and private sectors. Current methods employ high-resolution optical and infrared cameras or scanners to image the face, or read finger prints or iris patterns in the eye. These approaches work with reasonable accuracy but usually require direct (or extremely close) contact with the person to be identified: for example, by placing a hand on the scanner plate to record fingerprints, or placing one's head against a positioning-frame to allow a lens to produce a high-resolution image of the eye.

Identification based on fingerprints has been widely deployed in recent years for security and immigration applications, and is even being used in some computer systems for user login identification. However, such systems are sensitive to the presence of dirt on the fingers, often require reapplication of the finger, and are sensitive to variants such as the pressure of the finger during the fingerprint acquisition process. Fingerprint identification may also be fooled by using artificially gummy fingers. Facial recognition methods on the other hand, are not necessarily limited to very-close range, but the subject must be facing in the direction of a camera since a clear, well-lit image is required. Thus it is relatively easy to evade such systems by wearing a disguise, a face mask, or tilting the head down to avoid providing a clear image of the face. Visual face recognition methods of course depend critically on the quality of the image, which renders such systems sensitive to range and illumination.

In one embodiment, the invention relates to a system for biometrically identifying a person using microwave radiation, the system including at least one processor configured to segment a microwave cardiac signal including cardiac beats into segments, to extract features from the segments, and to perform pattern identification of the segments and features with a pre-existing data set, where the microwave cardiac signal is obtained from reflected microwave radiation including an electrocardiographic waveform and an impedance-cardiographic waveform. In another embodiment, the invention relates to a method for biometrically identifying a person using microwave radiation, the method including segmenting a microwave cardiac signal including cardiac beats into individual segments, where the microwave cardiac signal is obtained from reflected microwave radiation including an electrocardiographic waveform and an impedance-cardiographic waveform, extracting features from the segments, and performing pattern identification of the features in the individual segments with a pre-existing data set.

DESCRIPTION OF EMBODIMENTS

Figure 1:
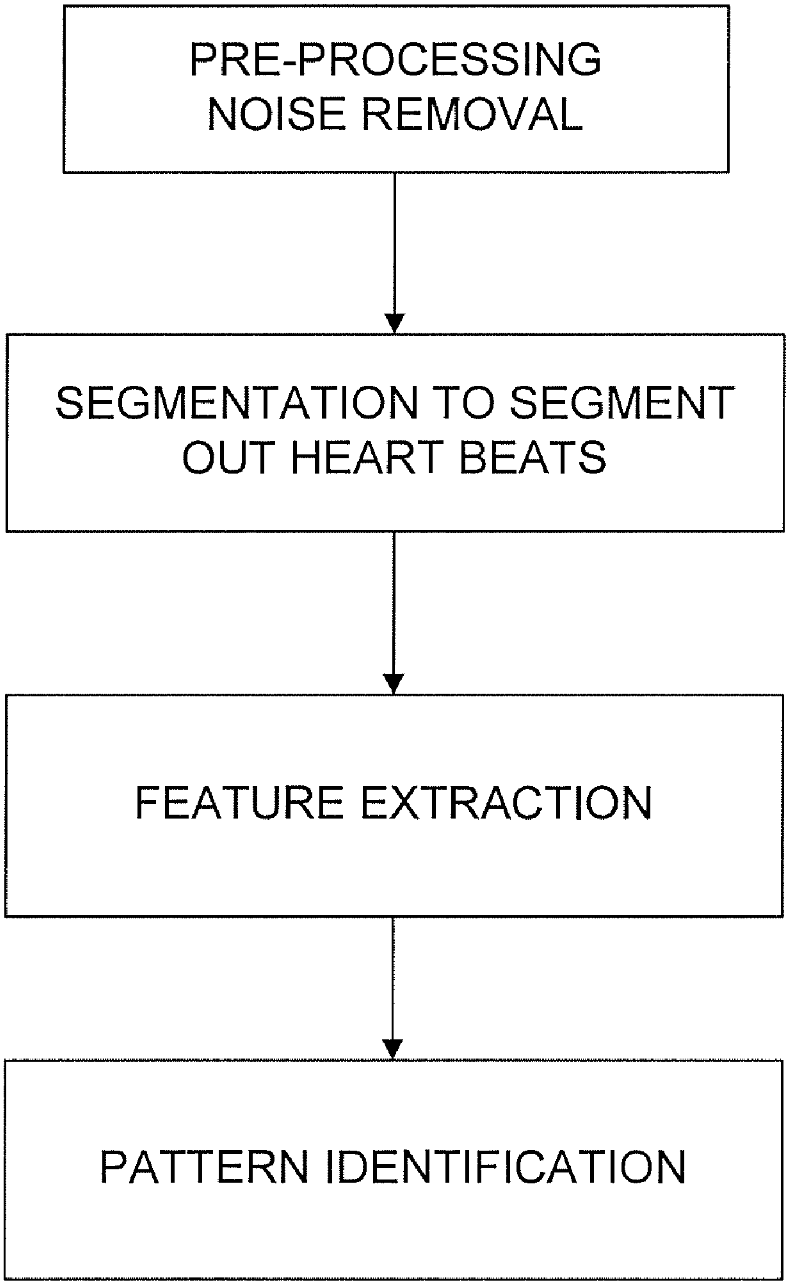
FIG. 1 illustrates an embodiment of the present invention.

In the description that follows, the scope of the term "some embodiments" is not to be so limited as to mean more than one embodiment, but rather, the scope may include one embodiment, more than one embodiment, or perhaps all embodiments.

In the past few years, it has been demonstrated that an electrocardiographic (ECG) waveform may be used to identify a person, with an accuracy of about 95%. This is significantly better than the typical accuracy of a fingerprint. However, an ECG usually requires at least 2 electrodes attached to the person, which has limited its usefulness in real world applications. A recently developed microwave cardiogram, disclosed in a published US patent application (publication number 20040123667), may be employed to provide a unique bio-signature for a person. This approach uses a specially designed microwave transceiver to form a narrow beam directed at the person of interest. The reflected microwave signal contains both the electrocardiographic waveform and the impedance-cardiographic (ICG) waveform of a person. This technique works over large distances, up to tens of meters, and it is very difficult to alter or disguise the ECG and ICG waveforms because they are a fundamental aspect of a person's physiology. The microwave signal may penetrate barriers such as walls and doors, allowing for new capabilities in human identification.

Embodiments use a microwave cardiogram as a bio-signature for an individual. The microwave cardiogram may be measured over distances of several meters, and through barriers such as doors and walls using a microwave signal, to provide a non-contacting, remote sensing method to accurately identify specific individuals.

Embodiments process in real time the reflected microwave signal, which contains the cardiac signature of the person, using digital signal processing techniques. Embodiments use machine learning-template methods to segment out each cardiac beat, and then statistically compare a few beats of the microwave cardiogram to a pre-existing data set in order to identify the individual.

A remote microwave cardiogram human identification system according to some embodiments may be comprised of two primary subsystems: an active microwave system to remotely measure the cardiac related waveforms of an individual, and a back-end signal processing system to determine the identity of an individual based on his or her microwave reflection signal. As discussed above, the measurement of the microwave cardiogram is the subject matter of a published patent application (publication number 20040123667). An example of a remote cardiogram human identification system according to an embodiment may be described as follows. An RF (Radio Frequency) oscillator generates a microwave signal that is coupled to a high-directivity antenna by a circulator. This antenna forms a narrow beam directed at the person to be identified. A fraction of the incident signal is reflected back from the person and picked up by the same antenna. The received signal is amplified, bandpass filtered, and the signal power level is measured with a conventional detector. This signal power waveform is supplied to a back-end signal processing system for real time analysis. The microwave power levels used are typically less than 1 milliwatt, and are expected to be hundreds to thousands of times lower than the maximum permissible dose level considered safe by the IEEE Standards Committee on RF Exposure.

The amplitude of the reflected signal will have a relatively large DC (Direct Current, or static) component due to the static, or basal, impedance of the illuminated tissue, and a small, unique time-varying component due the time-dependent impedance of the tissue. The microwave beam penetrates several millimeters of skin tissue only, and thus is affected primarily by changes in the impedance of the dermis, which contains blood vessels, as well as a significant amount of extracellular fluid in the supporting matrix, There are at least two contributions to the total time dependent impedance of interest: the volume of blood present in the tissue, and the concentration of ions (Na+, CI— and others) in the extracellular fluid. Both of these contributions are periodic in time, and are driven by the mechanical and electrical action of the heart. These cardiac-related time-dependent changes are relatively very small, about 0.5% or less of the basal impedance. However, these changes in the volume of blood and extracellular ion concentration uniquely modulate the amplitude of the reflected microwave signal to provide simultaneously the electrocardiographic waveform and impedance cardiographic waveform of the individual. This composite waveform may be referred to as the microwave cardiogram.

Embodiments perform signal processing to process the microwave cardiogram signals and to determine the identity of the individual. The identification process may comprise two phases (sub-processes): an offline phase where a library of microwave cardiograms of known individuals are built up, and an on-line phase where the microwave cardiogram from an unknown individual is preprocessed, segmented, and matched against the library of known individuals constructed in the off-line phase.

For some embodiments, the signal processing may include, but is not limited to, a preprocessing noise removal step; a segmentation procedure to segment out each beat in the cardiac signal; a feature extraction procedure to derive salient features from each beat; and a pattern identification procedure using the segmented signals and the salient features. A flow diagram outlining the signal processing is illustrated in FIG. 1. For some embodiments, the boxes in FIG. 1 may represent one or more software-controlled processes running on a computer system, special purpose or programmable modules, or perhaps combinations thereof.

Various modifications may be made to the disclosed embodiments without departing from the scope of the invention as claimed below.

What is claimed is:

1. A system for biometrically identifying a person using microwave radiation, the system comprising at least one processor configured to segment a microwave cardiac signal comprising cardiac beats into segments, to extract features from the segments, and to perform pattern identification of the segments and features with a pre-existing data set; wherein the microwave cardiac signal is obtained from reflected microwave radiation comprising an electrocardiographic waveform and an impedance-cardiographic waveform.

2. The system of claim 1, further comprising:

a receiver configured to receive a microwave signal, where the microwave cardiac signal comprising the cardiac beats is derived from the received microwave signal.

3. The system of claim 2, wherein each cardiac beat is segmented into one of the segments.

4. The system of claim 1, wherein the microwave cardiac signal comprises information indicative of a volume of blood of the person.

5. The system of claim 4, wherein the microwave cardiac signal comprises information indicative of an extracellular ion concentration of the person.

6. A method for biometrically identifying a person using microwave radiation, the method comprising:

segmenting a microwave cardiac signal comprising cardiac beats into individual segments, wherein the microwave cardiac signal is obtained from reflected microwave radiation comprising an electrocardiographic waveform and an impedance-cardiographic waveform;

extracting features from the segments; and performing pattern identification of the features in the individual segments with a pre-existing data set.

7. The method of claim 6, further comprising:

receiving a microwave signal reflected from a person; and deriving the microwave cardiac signal from the received microwave signal.

8. The method of claim 7, wherein each segment corresponds to one of the cardiac beats.

* * * * *